United States Patent [19]

Williams

[11] 3,827,523

[45] Aug. 6, 1974

[54] ENGINE COOLING FROM EXHAUST GAS TURBINE

[75] Inventor: Dick H. Williams, Oak Park, Mich.

[73] Assignee: General Motors Corporation, Detroit, Mich.

[22] Filed: May 10, 1973

[21] Appl. No.: 359,184

[52] U.S. Cl............. 180/68 R, 123/41.49, 165/122, 180/64 A
[51] Int. Cl............................................ B60k 11/04
[58] Field of Search.... 180/68 R, 64 A, 54 A, 66 A; 165/122; 123/41.48, 41.49

[56] References Cited
UNITED STATES PATENTS

| | | | |
|---|---|---|---|
| 1,862,675 | 6/1932 | Froesch et al. | 180/68 R |
| 2,242,494 | 5/1941 | Wolf | 180/54 A |
| 3,203,499 | 8/1965 | Bentz et al. | 180/68 R |
| 3,715,001 | 2/1973 | Wilson | 180/68 R |

Primary Examiner—Kenneth H. Betts
Assistant Examiner—David M. Mitchell
Attorney, Agent, or Firm—K. H. MacLean, Jr.

[57] ABSTRACT

A combined cooling and exhaust system for a vehicle such as a truck powered by a liquid-cooled engine including a housing enclosing a coolant-filled radiator and having an air inlet at one end adapted to be positioned in the stream of air flowing over the moving vehicle. A rotary type compressor is located adjacent the air outlet portion of the radiator and is adapted to draw air through the radiator from the air outlet. The rotary compressor is connected by a drive shaft to a rotary type turbine located in a separated exhaust gas passage of the housing and adapted to extract energy from the exhaust gas and convert it into rotary energy to power the compressor. Air from the radiator is ducted to atmosphere through a relatively large diameter outlet tube extending from the compressor which encircles a smaller diameter exhaust gas tube connected to the turbine whereby the exhaust gas is cooled and exhaust noise muffled by the air flowing in the annular space between the two tubes.

3 Claims, 4 Drawing Figures

_ENGINE COOLING FROM EXHAUST GAS TURBINE_

SPECIFICATION

This invention relates to a combined cooling and exhaust system for motor vehicles.

Presently, motor vehicles having liquid-cooled engines utilize radiators which are located in the forward portion of the engine compartment to receive air flowing through a grill. To provide necessary air flow through the radiator when the vehicle is idling, a fan is usually connected to the engine crankshaft immediately behind the radiator. The fan reduces the useful horsepower for propelling the vehicle and is relatively expensive in that it also requires pulleys, belts and bearings for connecting the fan to the engine. Another undesirable feature of a fan is the noise produced.

An undesirable feature of utilizing a radiator located in front of the engine is the increase in frontal drag caused by the resistance to air flow through the radiator. Another result is that engine cooling by air flowing directly over the engine is diminished by the amount the air is warmed by the radiator and also the decrease in the air flow rate.

The present invention provides an integral or combined cooling and exhaust system for a vehicle and is particularly adapted to use on large vehicles such as trucks. It includes a housing having an air inlet at one end which is adapted to be positioned in the stream of air flowing over the top of the vehicle cab. The air flows downward in the housing and then through a radiator and out the bottom of the housing. A rotary compressor adjacent the outlet from the radiator draws air through the radiator under idle conditions. The compressor is powered by rotary turbine which is connected to the other end of the same shaft as the compressor. The turbine is rotated by the flow of hot exhaust gases therethrough. The exhaust from the turbine then passes through an exhaust tube which is encircled by a larger diameter air outlet tube extending from the radiator. This arrangement of air flow around the exhaust muffles noise from the engine exhaust and cools the exhaust gas before it is released to the atmosphere.

An integral cooling and heating system is also desirable because one basic model may be common to many truck applications having varying engine capacities. Of course, the radiator within the housing may vary in size to compensate for increased need for cooling capacity but the housing structure and turbine-compressor may be used with many truck engine applications.

Therefore, an object of the present invention is to provide a combined cooling and exhaust assembly for motor vehicles including a housing having a first chamber with an inlet and an outlet for the passage of air through a radiator located in the first chamber and a second chamber with an inlet and an outlet adapted to be connected to the vehicle exhaust with the exhaust gases driving a rotary turbine which is connected to a rotary compressor adjacent the outlet of the first chamber.

A further object of the present invention is to provide a combined cooling and exhaust assembly for motor vehicles including a housing defining a separated air flow passage for radiator cooling and an exhaust gas passage with the exhaust gas passage adapted to be connected to an exhaust tube for release of the gas to atmosphere and a larger diameter air discharge tube around the exhaust tube to cool exhaust gases and muffle exhaust noises.

A still further object of the present invention is to provide a combined cooling and exhaust assembly especially adaptable for use on truck type motor vehicles including a housing which encloses a radiator and designed to be mounted vertically behind the truck cab with an air inlet projected into the stream of air which flows over a moving vehicle.

Still further objects of the combined cooling and exhaust system are the elimination of a radiator mounted in front of the vehicle engine which contributes to frontal drag and is detrimental to direct cooling of the engine, elimination of the fan previously mounted on the front of the engine which was noisy and the pulleys, belts and bearings associated with such a fan and the provision of a standard cooling assembly for different trucks and vehicles which is simply modified by utilization of different capacity radiators in the standard housing.

Further objects and advantages of the present invention will be readily apparent from the following detailed description, reference being had to the accompanying drawings in which a preferred embodiment is clearly illustrated.

IN THE DRAWINGS

Figure 1:
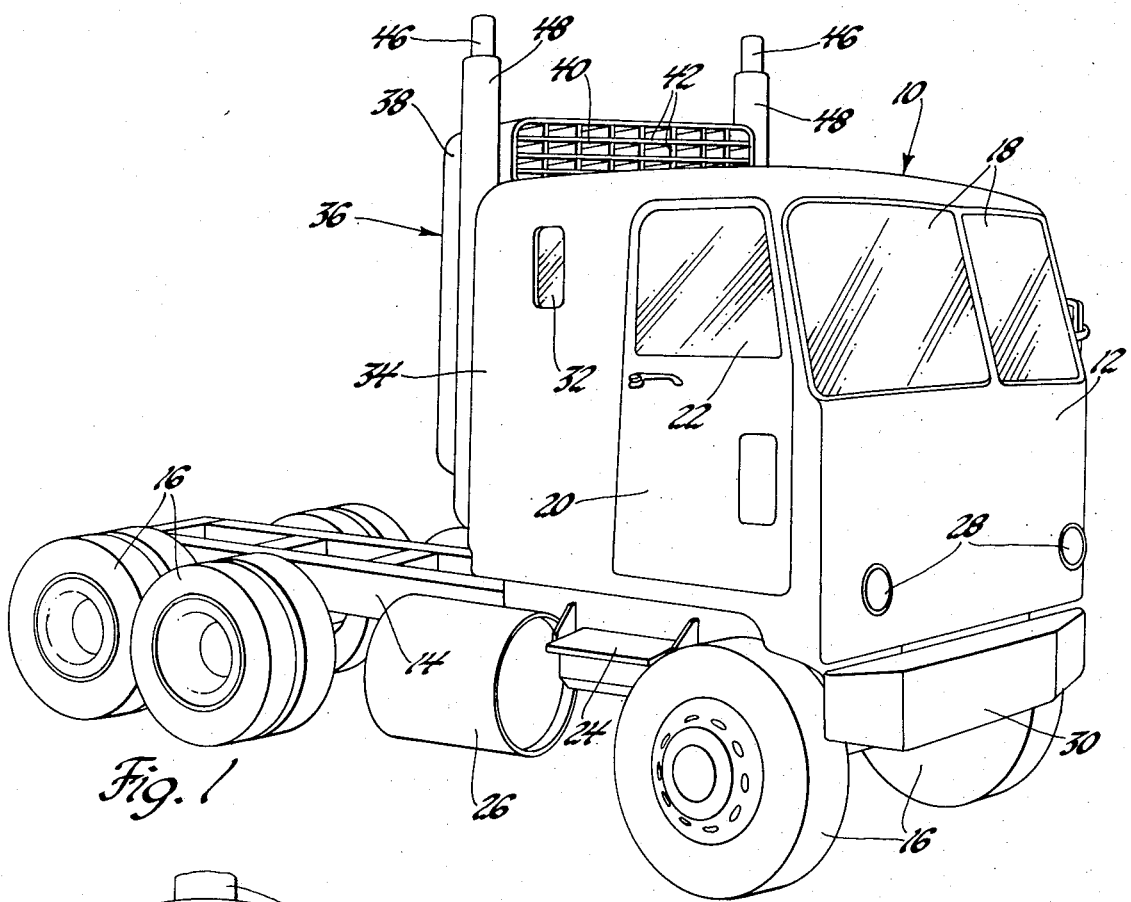
FIG. 1 is a perspective view of a truck type motor vehicle with the present combined cooling and exhaust assembly.

In FIG. 1 of the drawings, a truck type motor vehicle 10 is illustrated including a cab 12 on a frame 14. Wheels 16 are mounted upon axles (not visible). Cab 12 includes front windows 18 and a side door 20 having a side window 22. A step 24 aids the operator or passenger of the vehicle 10 to enter door 20. Also shown in FIG. 1 is a side mounted gas tank 26, headlights 28, bumper 30 and a small rear window 32 for the rear sleeper portion 34 of cab 12.

Figure 2:
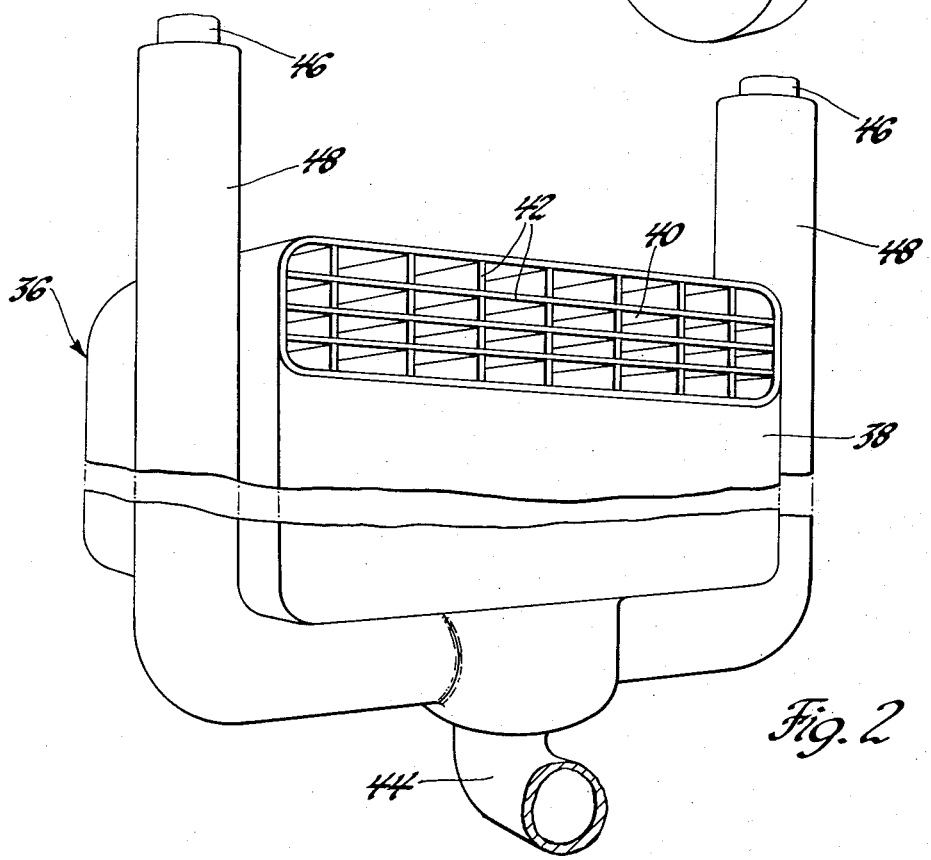
FIG. 2 is a separate perspective view of the cooling and exhaust assembly shown in FIG. 1.
Figure 3:
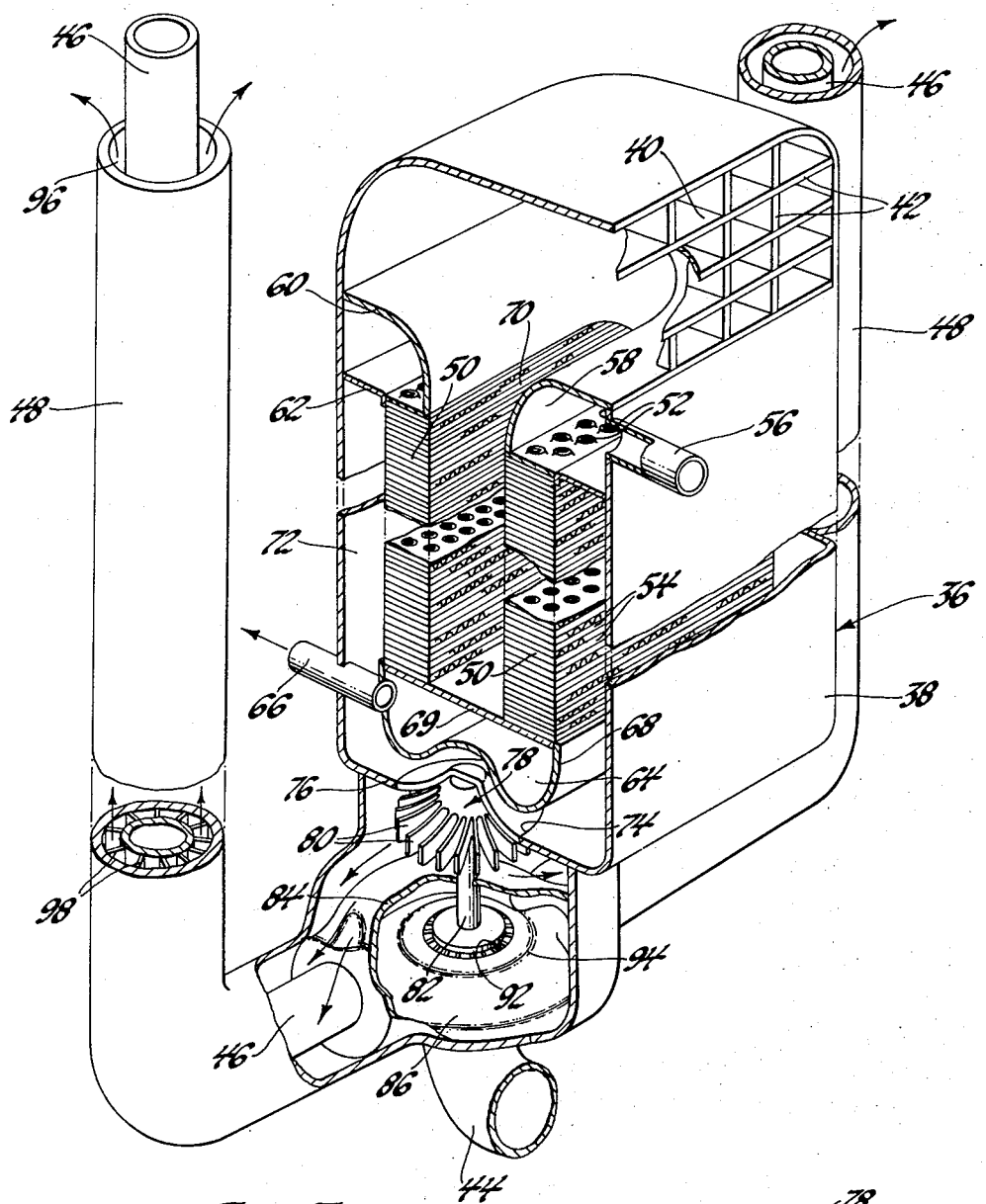
FIG. 3 is a partially sectioned view of the cooling and exhaust assembly.
Figure 4:
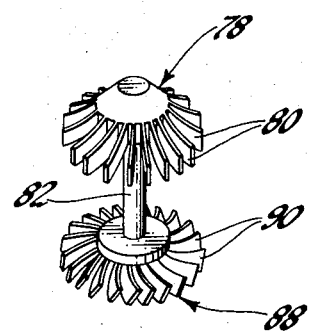
FIG. 4 is a detail view of the compressor-turbine assembly shown in FIG. 3.

In FIGS. 1 and 2, the present combined cooling and exhaust assembly 36 is shown. The assembly 36 includes a housing 38 having an air inlet 40 subdivided by grill members 42. The internal portions of assembly 36 are best shown in FIG. 3 in which an exhaust gas conducting means such as exhaust header or tube 44 is partially shown. It extends from the engine exhaust ports to the assembly 36. Also shown are exhaust pipes 46 which vertically discharge the exhaust gases from the assembly to atmosphere. Concentrically around the exhaust pipes 46 are large diameter air discharge pipes 48 which convey air from the radiator 50 enclosed within housing 38.

The housing 38 encloses radiator 50 which has a generally curved or donut shape. It is a tube and fin type radiator with the tubes 52 extending vertically through stacks of parallel corrugated fin sheets 54. Coolant from the engine is introduced through inlet 56 to an inlet chamber 58 formed about the upper side of radiator 50 by interior wall members 60 and 62. Water is discharged from an outlet chamber portion 64 at the bottom of the radiator 50 through outlet 66. A curved wall member 68 and flat member 69 form the outlet chamber 64.

Air is drawn through the inlet 40 and is deflected by the wall member 60 into a central space 70 formed between opposite walls of radiator 50. The air then passes through the radiator 50 between the corrugated fin sheets 54 and is discharged into an outlet chamber 72 formed by housing 38 around the radiator 50. The air then flows from chamber 72 through an outlet 74 in a bottom wall 76. A rotary compressor 78 having a plurality of outwardly extending blades 80 is mounted adjacent outlet 74. It draws air from the chamber 72 through outlet 74 to atmosphere through air outlet pipes 48.

The rotary compressor 78 is attached to the upper end of a shaft 82 which extends downward through a partition or wall 84 into an exhaust portion or chamber 86 of housing 38. Exhaust chamber 86 conducts hot exhaust gases to exhaust pipes 46. A rotary turbine 88 having radial blades 90 is attached to the lower end of drive shaft 82. The turbine 88 is positioned adjacent an opening 92 in member 94 separating the interior of tube 44 from chamber 86. As the exhaust gas flows from tube 44 into housing 38, it encounters blades 90 of turbine 88. In passing through the turbine 88 part of the energy of the exhaust gas is converted into rotary motion of the turbine. This rotation is directly transmitted to the compressor 78 to pass air through the radiator 50 when the vehicle is motionless. After the turbine 88, the exhaust gas enters exhaust pipe 46.

The exhaust pipe 46 is located concentrically within the large diameter discharge air pipe 48. The annular space 96 between the pipes 46 and 48 also has a plurality of radially extending fin members 98 which transmit heat from the hot exhaust gases to air flowing through the annular space 96. This cools the exhaust stack and muffles exhaust noise otherwise transmitted. The flow of exhaust gas from pipe 46 and heated air from annular space 96, is directed upwards over the trailer (not shown) which the truck may be hauling. This also helps to reduce drag.

Although the embodiment shown is a preferred embodiment, other embodiments might be adapted without being outside the scope of the following claims which define the invention.

What is claimed is as follows:

1. A combination engine cooling and exhaust system for use in a vehicle propelled by an engine cooled by liquid coolant comprising: a housing which encloses a coolant-filled radiator having inlet and outlet means adapted to be fluidly connected to the engine and a fluid pump for conveying coolant from the engine to the radiator and from the radiator back to the engine; said housing having an air inlet adapted to be positioned in the flow of air over the vehicle to supply cooling air to the radiator; rotary type compressor with its inlet located downstream of said radiator for drawing air through said radiator from said air inlet; said rotary compressor being attached to one end of a drive shaft which extends through an internal wall of said housing into an adjacent exhaust gas passage; a rotary type turbine attached to the second end of said drive shaft within said exhaust gas passage and positioned with respect to the flow of exhaust gases to convert a portion of the exhaust energy into rotary motion of said interconnected turbine and compressor; air outlet means for transmitting the exhaust gases to the atmosphere after passing through said turbine.

2. A combination engine cooling and exhaust system for use in a vehicle propelled by an engine cooled by liquid coolant comprising: a housing which encloses a coolant-filled radiator having inlet and outlet means adapted to be fluidly connected to the engine and a fluid pump for conveying coolant from the engine to the radiator and from the radiator back to the engine; said housing having an air inlet adapted to be positioned in the flow of air over the vehicle when it is in motion for supplying cooling air to the radiator; a multi-bladed rotary type compressor with its inlet located downstream from the air outlet of said radiator for drawing air through said radiator from said air inlet; said rotary compressor having an outlet connected to an air outlet tube for transmitting the warmed air from the radiator to atmosphere; said rotary compressor being attached to one end of a drive shaft which extends through an internal wall of said housing into an exhaust gas passage fluidly connected to the exhaust outlet of the engine; a multi-bladed rotary type turbine attached to the second end of said drive shaft within said exhaust gas passage and positioned with respect to the flow of exhaust gases to convert a portion of the exhaust energy into rotary motion of said interconnected turbine and compressor; gas outlet means extending from said turbine and including a relatively small diameter tube concentrically located within said air outlet means for transmitting the exhaust gas to the atmosphere after passing through said turbine whereby heat from the exhaust gases is transferred to the encircling air in said air outlet tube and noise is muffled.

3. A combination engine cooling and exhaust system for use in a vehicle propelled by an engine cooled by liquid coolant comprising: a housing which encloses a coolant-filled radiator having inlet and outlet means adapted to be fluidly connected to the engine and a fluid pump for conveying coolant from the engine to the radiator and from the radiator back to the engine; said housing having an air inlet adapted to be positioned in the flow of air over the vehicle when it is in motion for supplying cooling air to the radiator; a multi-bladed rotary type compressor with its inlet located downstream from the air outlet of said radiator for drawing air through said radiator from said air inlet; said rotary compressor having an outlet connected to an air outlet tube for transmitting the warmed air from the radiator to atmosphere; said rotary compressor being attached to one end of a drive shaft which extends through an internal wall of said housing into an exhaust gas passage fluidly connected to the exhaust outlet of the engine; a multibladed rotary type turbine attached to the second end of said drive shaft within said exhaust gas passage and positioned with respect to the flow of exhaust gases to convert a portion of the exhaust energy into rotary motion of said interconnected turbine and compressor; gas outlet means extending from said turbine and including a relatively small diameter tube concentrically located within said air outlet means for transmitting the exhaust gas to the atmosphere after passing through said turbine; fin means between said inner exhaust outlet tube from said turbine and said encircling air outlet tube for transmitting heat from said exhaust to the surrounding air within the air outlet tube whereby a portion of the engine noise is muffled and the exhaust gas is cooled.

* * * * *